United States Patent

Sigai et al.

[11] Patent Number: 5,309,069
[45] Date of Patent: *May 3, 1994

[54] PHOSPHORS WITH IMPROVED LUMEN OUTPUT AND LAMPS MADE THEREFROM

[75] Inventors: A. Gary Sigai, Lexington; Keith A. Klinedinst, Marlboro, both of Mass.

[73] Assignee: GTE Products Corporation, Danvers, Mass.

[*] Notice: The portion of the term of this patent subsequent to May 12, 2009 has been disclaimed.

[21] Appl. No.: 860,824

[22] Filed: Mar. 31, 1992

Related U.S. Application Data

[60] Continuation-in-part of Ser. No. 667,772, Mar. 11, 1991, Pat. No. 5,113,118, which is a division of Ser. No. 468,432, Jan. 22, 1990, Pat. No. 5,051,277.

[51] Int. Cl.$^5$ .................. H01J 63/04; H01J 1/62
[52] U.S. Cl. .................. 313/486; 313/485; 313/487; 313/489
[58] Field of Search ............... 313/485, 486, 487, 489

[56] References Cited

U.S. PATENT DOCUMENTS

| | | | |
|---|---|---|---|
| 3,408,223 | 10/1968 | Shortes | 117/100 |
| 4,363,998 | 12/1982 | Graff et al. | 313/487 |
| 4,585,673 | 4/1968 | Sigai | 427/213 |
| 4,691,140 | 9/1987 | Sakakibara | 313/486 |
| 4,710,674 | 12/1987 | Sigai | 313/489 |
| 4,803,400 | 2/1989 | Peters et al. | 313/489 |
| 4,877,651 | 10/1989 | Dory | 427/255 |
| 5,113,118 | 5/1992 | Sigai et al. | 313/486 |

Primary Examiner—Donald J. Yusko
Assistant Examiner—Matthew J. Esserman
Attorney, Agent, or Firm—Frances P. Craig; Elizabeth A. Levy; Robert F. Clark

[57] ABSTRACT

A fluorescent lamp providing improved maintenance and brightness includes an alkaline earth halophosphate (Cool-White) phosphor, e.g. a calcium halophosphate phosphor, having a continuous protective bilayer coating of alumina surrounding silica surrounding the phosphor particles. The lamp may be a high color rendition fluorescent lamp in which a first layer of alkaline earth halophosphate phosphor coats an inner surface of the lamp envelope, and a second layer of phosphor overlies the first layer of phosphor. The second layer of phosphor is a mixture of red, blue and green emitting phosphors, at least one of these being a zinc silicate phosphor. Each of the alkaline earth halophosphate and zinc silicate phosphors have a bilayer coating in which a coating of alumina surrounds a coating of silica which surrounds the phosphor.

4 Claims, 8 Drawing Sheets

PHOSPHORS WITH IMPROVED LUMEN OUTPUT AND LAMPS MADE THEREFROM

CROSS-REFERENCE TO RELATED APPLICATIONS

This is a continuation-in-part of application Ser. No. 07/667,772 filed Mar. 11, 1991 which is a division of application Ser. No. 07/468,432, filed Jan. 22, 1990 and issued Sep. 24, 1991 as U.S. Pat. No. 5,051,277. This application is also related to application Ser. Nos. 07/667,694 (also a division of 07/468,482), now Pat. No. 5,087,523; 06/718,095, now Pat. No. 4,710,674; 06/718,096, now Pat. No. 4,585,673; 07/432,941, now Pat. No. 4,999,219; and 07/573,091, now Pat. No. 5,049,408. All of these applications are incorporated herein by reference.

FIELD OF THE INVENTION

The present invention relates to improved alkaline earth halophosphate phosphors. More specifically, the present invention involves a lamp utilizing such a phosphor coated with a layer of silica and then a coating of alumina. The lamp utilizing the "bilayer" phosphor shows both improved brightness and improved lumen maintenance.

BACKGROUND OF THE INVENTION

During certain phosphor synthesis and lamp fabrication steps, the finely divided luminescent materials may be exposed to oxidizing (oxygen-rich) atmospheres at elevated temperatures. An example of this is the so-called 'lehring' process used to burn away organic aqueous lamp coating dispersion. It is well known that the brightness of the finished fluorescent lamp may be reduced significantly as a result of the lehring operation (the so-called 'lehrloss'). This reduction in brightness may result from a partial oxidation of reactive low valence ions present in the phosphor lattice.

A somewhat more involved example relates to the lamp and process described in above-referenced U.S. Pat. Nos. 4,585,673 and 4,710,674, disclosing the formation of protective coatings (typically alumina coatings) upon the surfaces of finely divided phosphor particles via chemical vapor deposition using an organometallic precursor in a gas-fluidized bed. When calcium halophosphate or manganese-doped zinc silicate is alumina-coated via the process described in the '673 patent, and when fluorescent lamps are fabricated from the coated phosphor produced therefrom, these lamps display much better lumen maintenance than do similar lamps fabricated using the virgin (uncoated) zinc silicate phosphor.

During the fabrication of such lamps, the phosphor particles are typically dispersed in an aqueous medium. Unfortunately, if the water-based zinc silicate suspension is held-over for several days before use (a typical situation), the beneficial effects associated with the '673 can be lost. This 'holdover' problem can be overcome, however, by annealing the alumina-coated phosphor in the air at a temperature between about 700° C. and about 850° C. for a period of time ranging from about 15 minutes to about 20 hours as described in U.S. Pat. No. 4,803,400 to Peters et al. Unfortunately, while this coated phosphor annealing process solves the holdover problem, it can also cause the zinc silicate phosphor to react with the alumina coating. Zinc and manganese can diffuse into the alumina coating, probably forming a mixture of zinc and manganese aluminates. The coated a 'body color', and can suffer a reduction in visible light emission upon exposure to an ultraviolet light source. Moreover, very similar phenomena are observed, as well, when the virgin (uncoated) phosphor is subjected to the annealing process. The increased body color and reduced brightness which result from annealing both the uncoated and the '673 coated zinc silicate phosphor are believed to result partially from the oxidation of some of the divalent manganese ions located on the surface of the uncoated phosphor particles or within and on the surface of the reactive alumina coating.

Prior to the present invention, there was no known means of preventing these detrimental interactions between the phosphor and the oxygen-rich atmosphere within the annealing furnace. By means of the method described below, these detrimental interactions are virtually eliminated, allowing a phosphor coated by the process disclosed in the '673 patent to be thoroughly annealed without suffering reflectance or brightness losses.

Also described herein are lamps in which high brightness, high maintenance zinc silicate phosphors are used as components of triblend phosphors. As discussed previously, coated zinc silicate phosphors are unstable in the water based suspension systems used to manufacture fluorescent lamps. The phosphors must be annealed to stabilize the coated phosphor. However, the performance of such a phosphor suffers in terms of both brightness output and lumen maintenance after annealing. Attempts to improve the base phosphor performance prior to annealing include remilling and refiring (RMF) the phosphor. Such an alumina coated "RMF" phosphor shows improved lumen characteristics when used as a component in the high color rendition triblend layer. However, the remilling and refiring process results in a large loss of starting material, thus increasing cost of the phosphor. The present invention solves these problems in a novel and economical way.

In a related application, an improved compact fluorescent lamp can be manufactured using a coated phosphor as the green-emitting component. Compact fluorescent lamps of the twin-tube and double twin-tube variety have become important for energy conservation in recent years since they have efficiencies which far exceed those of conventional incandescent lamps. While these lamps are very cost-effective with very short payback periods, they, nevertheless, have high initial costs which have limited the scope of applications in which they have been exploited. Therefore, it is desirable to further reduce the cost of these lamps through the use of less expensive non-rare-earth-containing substitutes.

The compact fluorescent lamps currently employ two rare-earth based phosphors. They are $Y_2O_3$:Eu (Sylvania Type 2342) for the red emission and Mg aluminate: Ce,Tb (Sylvania Type 2293) for the green emission. No blue-emitting phosphor is required, since the blue components of the mercury discharge are used to achieve the proper color temperature of the emitted 'white' light. More recently, $LaPO_4$:Ce,Tb, manufactured by Nichia Corporation, is being considered as a replacement for the Type 2293. Because these materials contain expensive rare-earths as the activators, they are some of the most expensive phosphors commercially used.

As mentioned previously, a green-emitting zinc orthosilicate phosphor activated with manganese, also known by the mineral name willemite can be improved by the application of a bilayer coating prior to annealing. The bilayer consists of a thin coating of silica applied between the base phosphor and a conformal alumina coating which is exposed to the mercury discharge. The base phosphor is a zinc silicate phosphor doped with manganese and tungsten as described in U.S. patent application Ser. No. 06/902,265, now abandoned. This phosphor can be manufactured on production scale equipment using a single step firing procedure which provide very high yields (typically 90%). These high yields and efficiencies of scale provide substantial phosphor cost savings which far outweigh the cost of applying the intermediate silica layer. The use of the willemite phosphor which has been coated with silica and then with alumina can be used as the green-emitting component of economical, high color rendition fluorescent lamps.

The properties of Cool-White alkaline earth halophosphate phosphors, i.e., those which fall within class "C" of the Geldart Classification Scale, are apparently affected differently by an alumina coating than those of the zinc silicate phosphors described above. In the alumina coated zinc silicate phosphors, the lumen maintenance is very high in lamp tests. In the alumina coated Cool-White phosphor, the lumen maintenance is significantly improved. However some loss of brightness over time is still observed, the loss increasing with the lamp loading. The lumen maintenance decrease is particularly noticeable in the high load (HO) and very high load (VHO) lamps. The lumen maintenance can be further improved by activation with cadmium; however, the trend in recent years has been away from the use of heavy metals, prompting a search for ways to raise the lumen maintenance without the use of such elements. The lumen maintenance of an alkaline earth halophosphate phosphor, for example a calcium halophosphate activated with antimony and manganese can be improved by the application, prior to annealing, of the bilayer coating described herein. The bilayer consists of a thin coating of silica applied between the base phosphor and a conformal alumina coating which is exposed to the discharge. The calcium halophosphate phosphor which has been coated with silica and then with alumina can be used to great advantage in high load and high color rendition fluorescent lamps.

SUMMARY OF THE INVENTION

In one aspect, the invention is a fluorescent lamp including a hermetically sealed tubular glass envelope coated with an alkaline earth halophosphate phosphor. The lamp has bases at each end of the tubular glass envelope, electrodes, support electrical leads connected to the electrodes, the electrodes being coated with an electron-emission promoting material, and a mercury droplet within the tubular glass envelope. The phosphor has a bilayer coating including a coating of alumina surrounding a coating of silica which surrounds the phosphor.

In another aspect, the invention is a high color rendition fluorescent lamp including a light transmissive envelope having two ends, electrodes sealed into each end of the envelope, an arc generating and sustaining medium which includes mercury, a first layer of an alkaline earth halophosphate phosphor coating an inner surface of the light transmissive envelope, and a second layer of phosphor overlying the first layer of phosphor. The second layer of phosphor includes a mixture of red, blue and green emitting phosphors, at least one phosphor of the mixture being a zinc silicate phosphor. The alkaline earth halophosphate and zinc silicate phosphors each have a bilayer coating including a coating of alumina surrounding a coating of silica which surrounds the phosphor.

In narrower aspects of the invention, the alkaline earth halophosphate phosphor is a calcium halophosphate phosphor.

BRIEF DESCRIPTION OF THE DRAWINGS

For a better understanding of the present invention, together with objects, advantages and capabilities thereof, reference is made to the following Description and appended Claims together with the Drawings, in which:

DETAILED DESCRIPTION OF PREFERRED EMBODIMENTS

The process described herein involves the formation of a continuous and conformal coating of silica on the surfaces of zinc silicate or Cool-White phosphor particles via chemical vapor deposition (CVD) while the phosphor particles are suspended within an isothermal gas fluidized bed. Silica coatings are used to prevent reductions in brightness and development of body color when, for example, manganese activated zinc silicate ($Zn_2SiO_4$:Mn) phosphors are heated in air at temperatures above about 600° C. These silica coatings also act as diffusion barriers, preventing the migration of zinc and manganese from the surface of the $Zn_2SiO_4$:Mn phosphor through the silica coating and therefore also through the continuous and conformal alumina coatings that are formed on the surfaces of the silica coated phosphor particles. In the Cool-White phosphors, the silica coating between the phosphor and the continuous and conformal alumina coating results in marked improvement in the lumen maintenance of the phosphor. This improvement is particularly valuable in the high load HO and VHO lamps.

Figure 1:
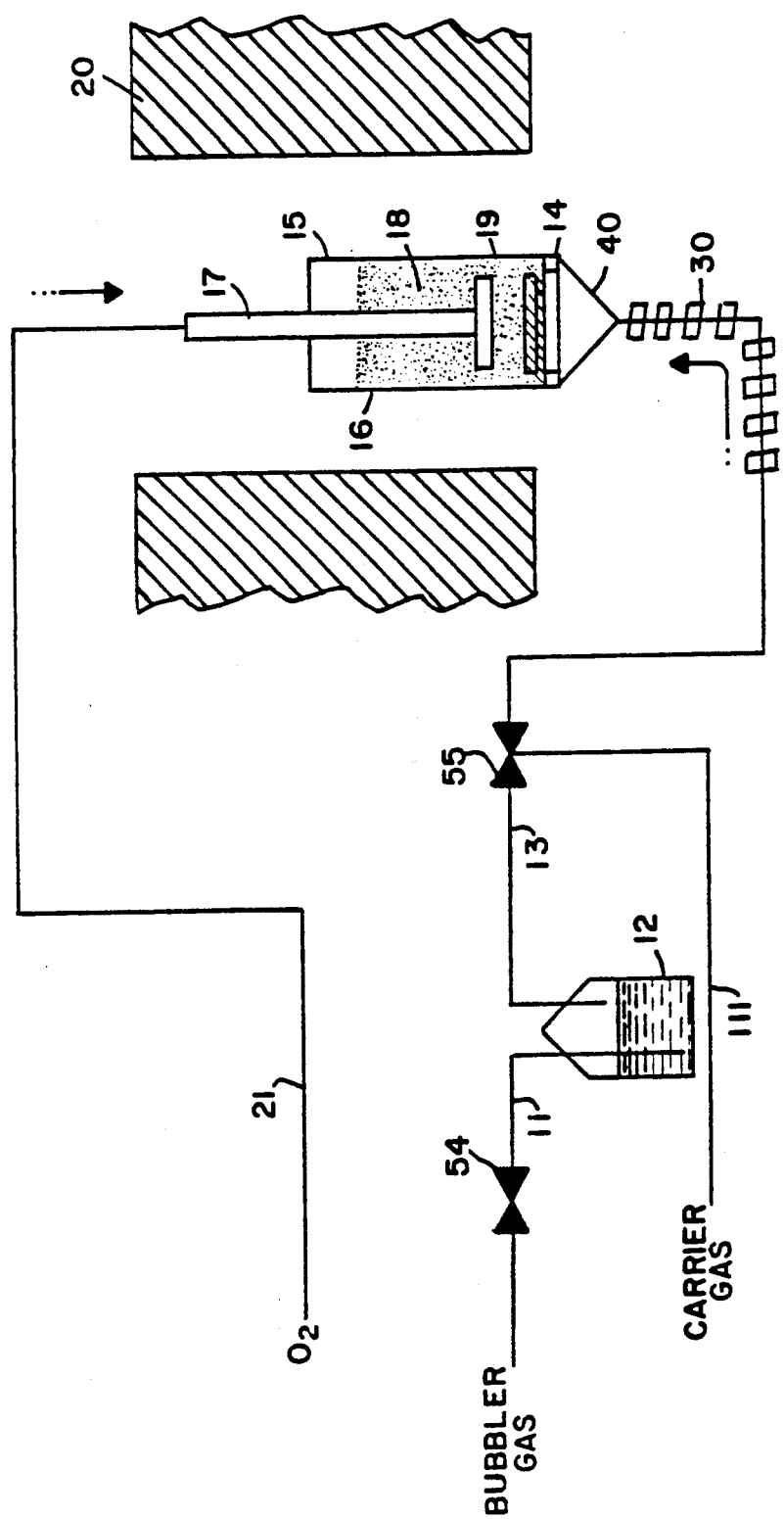
FIG. 1 is a schematic representation of an apparatus suitable for coating phosphor particles.

A schematic representation of the fluidized bed reactor used to coat the phosphor particles with silica is shown in FIG. 1. In FIG. 1, a feeder line 11 carries the inert bubbler gas through valve 54 into a stainless bubbler 12 which contains a silicon containing precursor such as tetramethoxysilane (TMOS) or tetraethoxyorthosaline (TEOS). In the bubbler 12, the coating precursor, TMOS or TEOS is vaporized into the bubbler gas. The bubbler is heated by heating means such as heating tape (not shown). The bubbler gas containing the TMOS or TEOS can be diluted by carrier gas to provide appropriate concentration of reactants. The bubbler gas containing the vaporized TMOS or TEOS is carried through connector line 13 and is diluted by the carrier gas at valve 55 which is carried through line 111. Lines 13 and 111 join and the resulting line is heated by heating tape 30 or other means. The bubbler and carrier gas with the TMOS passes through a stainless steel plenum 40 which is maintained at a temperature of about 32° C. The carrier gas along with the vaporized TMOS or TEOS then flows through a porous stainless steel gas distributor 14. The gas then flows into a quartz glass reaction tube 15. Within the reaction tube 15 is a vibrating mixer 17. Circumferentially located on the shaft of the vibrating mixer 17 and near the vibrating disc 19 are a series of holes 18 through which the oxidizing gas with or without an inert diluting gas enters the reaction tube 15. Oxygen is introduced to the reaction tube through line 21. No diluting gas means for the oxygen is shown in FIG. 1. The quartz glass reaction tube is surrounded by a furnace 20.

EXAMPLE 1

Figure 2:
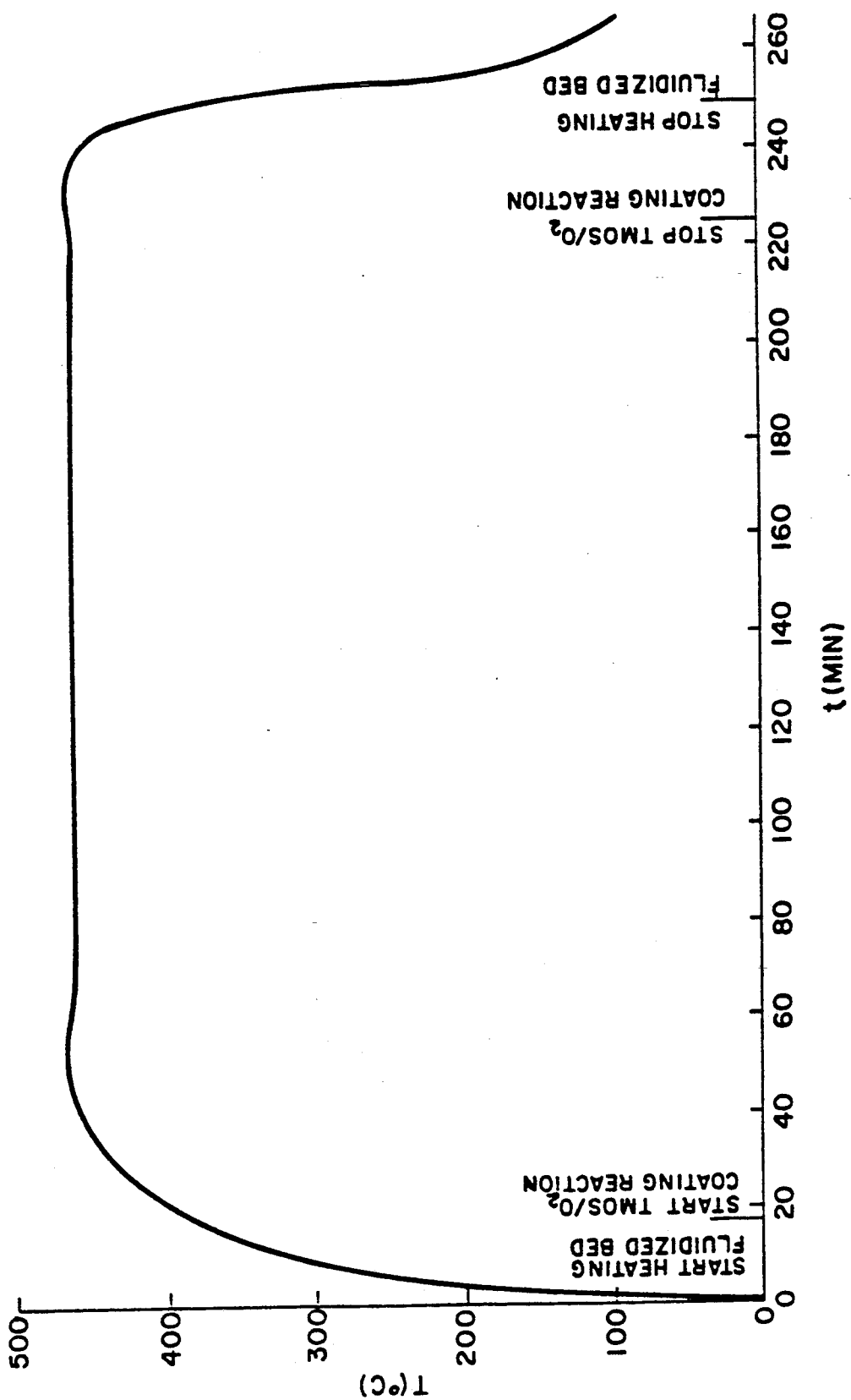
FIG. 2 is a bed temperature versus time graph for a TMOS/$O_2$ coating run using a manganese activated zinc silicate phosphor.

Aluminum Oxide C. (0.1%) was blended with each phosphor as a fluidization aid. The temperature of the fluidized bed reactor was maintained between 450° C. and 460° C. during the coating process. Further, due to the moisture produced within the high temperature fluidized bed as a byproduct of the TMOS oxidation reaction, the fluidized bed remained almost perfectly isothermal from the beginning to the end of each coating process run. A typical bed temperature versus time curve for a TMOS/O$_2$ coating run is shown in FIG. 2. In a typical run, 400 gm of the phosphor are coated using a 32° C. bubbler temperature, with 0.5 l/min nitrogen (the fluidizing gas medium) flowing through the TMOS bubbler, and with 0.6 l/min oxygen gas entering the fluidized powder bed (through the hollow stirrer rod) at a point a few centimeters above the level of the porous distributor plate.

Figure 3:
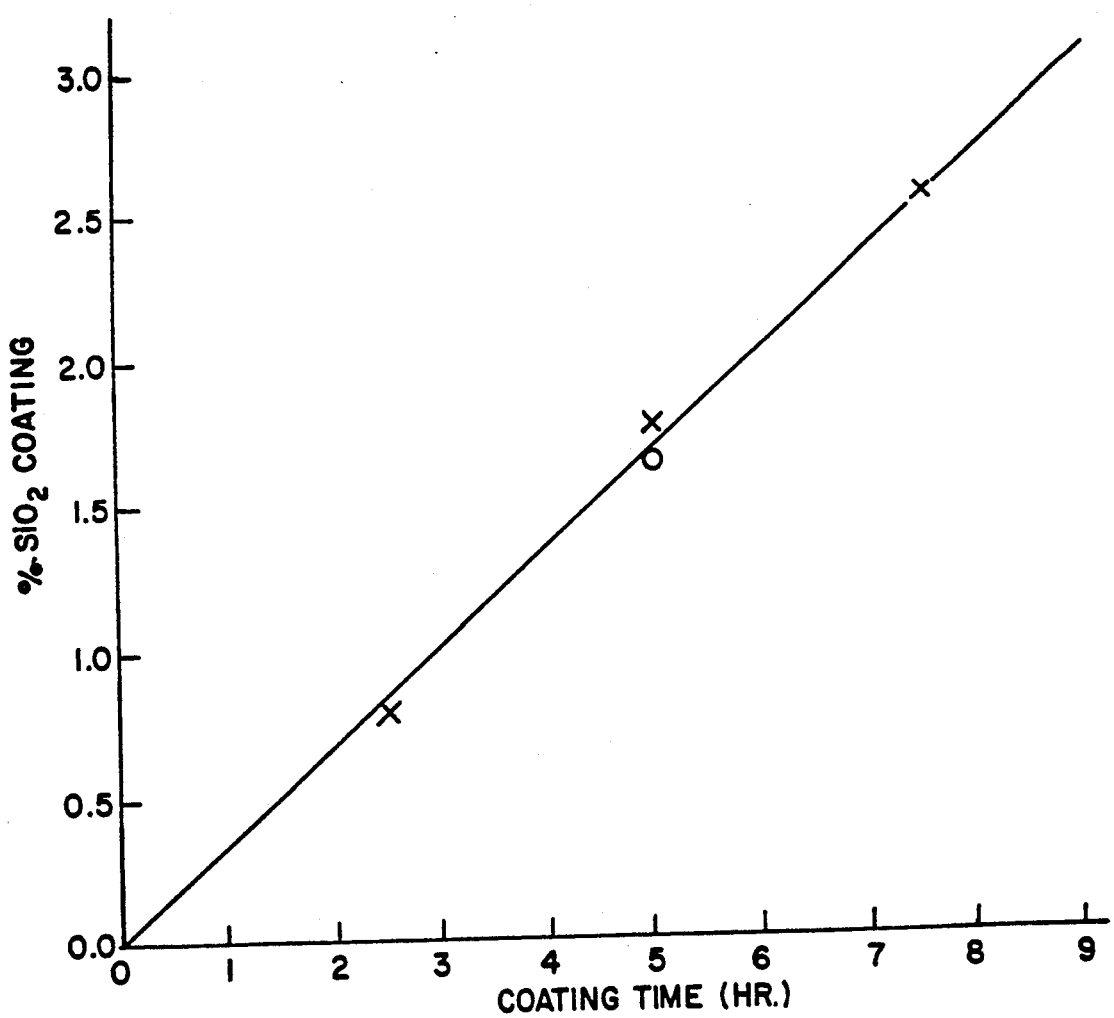
FIG. 3 shows the weight percent of silica on phosphor powder as a unction of coating time.

Coating reactions were carried out for times ranging between 2.5 hours and 7.5 hours. Subsequently, the amounts of silica deposited were determined analytically for several of the coated phosphors. The results of these determinations are listed in Table 1, which shows the results of chemical analyses for silica coatings on TMOS/O$_2$-coated Zn$_2$SiO$_4$ and Cool-White phosphors. These data are plotted vs coating time in FIG. 3. As shown, the amount of silica deposited via the TMOS/O$_2$ coating reaction increases linearly with increasing coating time.

TABLE 1

| Phosphor* | Coating Time, hr | Weight Percent SiO$_2$ |
|---|---|---|
| Zn$_2$SiO$_4$ | 5 | 1.65 |
| Cool-White | 2½ | 0.80 |
| Cool-White | 5 | 1.77 |

TABLE 1-continued

| Phosphor* | Coating Time, hr | Weight Percent SiO$_2$ |
|---|---|---|
| Cool-White | 7½ | 2.56 |

*400 g phosphors 0.5 l/m bubbler flow rate;
32° C. bubbler temperature;
0.6 l/m O$_2$ flow rate;
inert carrier gas for TMOS: N$_2$.

The silica-coated and uncoated zinc silicate and Cool-White phosphors were also examined via high resolution scanning electron microscopy. Photographic images were obtained at 20,000X and 50,000X magnification. There were no features observed in the photomicrographs obtained with the silica-coated materials that were not observed in the photomicrographs obtained with the corresponding uncoated phosphors. Thus, the silica coatings produced via the TMOS/O$_2$ reaction appear to be uniform and conformal to the surfaces of the underlying phosphor particles.

The continuity of the silica coatings formed on the Zn$_2$SiO$_4$:Mn and Cool-White phosphors were examined using X-ray photoelectron spectrometry. Typical normalized surface element relative atomic concentration data obtained with an uncoated and a silica-coated Zn$_2$SiO$_4$:Mn phosphor are compared in Table 2. Typical surface element uncoated and a silica-coated Cool-White phosphor are similarly compared in Table 3. In both Tables, the amount of silica is expressed in w/o (weight percent). As shown in Table 2, signals corresponding to zinc and manganese are completely absent from the XPS spectra obtained with the TMOS/O$_2$-coated zinc silicate phosphor. Similarly, except for a very small calcium signal, the XPS spectra obtained with the TMOS/O$_2$-coated Cool-White phosphor contain no evidence of the underlying phosphor. Thus, the silica coatings formed upon the surfaces of the phosphor particles appear to be continuous as well as conformal.

TABLE 2

| Coating on Zn$_2$SiO$_4$ | Zn (3p) | Si (2p) | Mn (2p) |
|---|---|---|---|
| None | 100 | 73 | 2 |
| ≈2 w/o SiO$_2$ (from TMOS/O$_2$ reaction) | 0 | 100 | 0 |

TABLE 3

| Coating on Cool-White | Ca (2p) | F (1s) | P (2s) |
|---|---|---|---|
| None | 100 | 23 | 63 |
| ≈2 w/o SiO$_2$ (from TMOS/O$_2$ reaction) | <1 | 0 | 0 |

EXAMPLE 2

Figure 4:
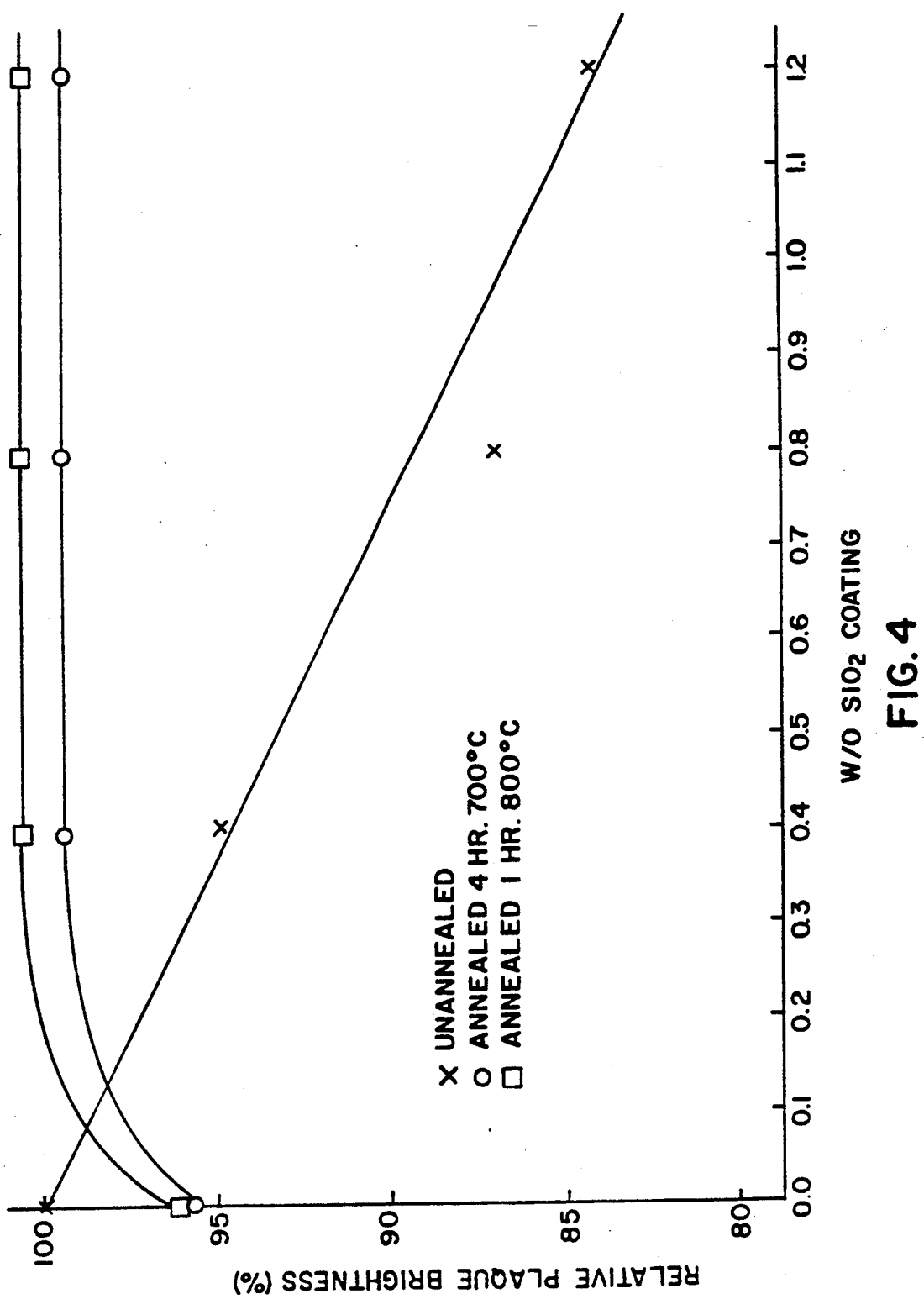
FIG. 4 shows the relative plaque brightness versus weight percent of silica coating on a zinc silicate phosphor.

Three different lots of Zn$_2$SiO$_4$:Mn phosphor were coated with silica according to the method described in Example 1. Samples of each phosphor, before and after silica-coating, were annealed in air for 4 hours at 750° C. Additional samples were likewise annealed in the air for one hour at 800° C. Portions of each annealed material were pressed into so-called plaques (i.e., they were pressed into molds so that uniformly flat horizontal surfaces were obtained.) A spot brightness meter equipped with a green photo-optic filter along with an unfiltered mercury plasma ultraviolet light source was used to measure a so-called plaque brightness for each sample, expressed relative to that of a sample of each uncoated and unannealed phosphor. The results of these measurements are listed in Table 4. The relative plaque brightnesses measured with phosphor lot #1 are also plotted vs w/o silica added during the TMOS/$O_2$-coating process in FIG. 4.

TABLE 4

| Phosphor Lot | w/o $SiO_2$ Coating | Anneal Conditions | Rel. Plaque Brightness (%) |
| --- | --- | --- | --- |
| 1 | 0 | none | 100.0 |
|   |   | 4 hr/750° C. | 95.6 |
|   |   | 1½ hr/800° C. | 96.0 |
| 1 | 0.40 | none | 94.8 |
|   |   | 4 hr/750° C. | 99.3 |
|   |   | 1½ hr/800° C. | 100.4 |
| 1 | 0.80 | none | 86.9 |
|   |   | 4 hr/750° C. | 99.3 |
|   |   | 1½ hr/800° C. | 100.4 |
| 1 | 1.20 | none | 84.2 |
|   |   | 4 hr/750° C. | 99.3 |
|   |   | 1½ hr/800° C. | 100.4 |
| 2 | 0 | none | 100.0 |
|   |   | 4 hr/750° C. | 95.9 |
|   |   | 1½ hr/800° C. | 95.9 |
| 2 | 1.20 | none | 78.1 |
|   |   | 1½ hr/800° C. | 100.3 |
| 3 | 0 | none | 100.0 |
|   |   | 4 hr/750° C. | 95.7 |
|   |   | 1½ hr/800° C. | 95.9 |
| 3 | 1.20 | none | 80.0 |
|   |   | 1½ hr/800° C. | 101.9 |

*Bubbler Temp. = 32–33° C.;
Bubbler Flow Rate = 0.5 l/m;
$O_2$ Flow Rate = 0.6 l/min;
Powder Wt. = 400 g;
Coating Temp. = 450–460° C.

As shown, the brightness of the uncoated phosphor is lowered by at least 4% when annealed in the air at 750° C. or at 800° C. A body color (corresponding to a reduction in reflected visible light) also develops during the annealing of the uncoated phosphor. On the other hand, sizable reductions in brightness are also observed with the unannealed silica-coated phosphors. Moreover, the thicker the silica coating, the lower the measured plaque brightness. For instance, the plaque brightness measured with a zinc silicate phosphor coated with 1.20 w/o silica (via the TMOS/$O_2$ reaction) is only around 80% of that measured with the uncoated phosphor.

In contrast, plaque brightnesses nearly equal to or exceeding those measured with the uncoated and unannealed phosphor are obtained with silica-coated phosphors that have been annealed in the air at temperatures between 750° C. and 800° C. Such silica-coated and annealed materials are also notable for an absence of the body-color that develops during the annealing of the uncoated phosphor. Therefore, whereas the uncoated phosphor cannot be air-annealed without suffering a 4% to 5% reduction in plaque brightness as well as a reduction in reflected visible light, the brightness of a silica-coated phosphor actually increases with increasing annealing temperature to a level exceeding that measured with the uncoated and unannealed phosphor, itself.

EXAMPLE 3

The implication of the data shown in Example 2 is that detrimental interactions which normally occur between the phosphor and the air during the annealing step are prevented when the phosphor is coated with a thin layer of silica. The body-color that develops during the annealing of the uncoated $Zn_2SiO_4$:Mn phosphor suggests that the $Mn^{2+}$ ions located on or near to the phosphor particle surface are oxidized during the anneal. However, it is possible that the body color is due to oxidized tungsten at the phosphor particle surface. The absence of this undesirable body-color, the undiminished brightnesses obtained with annealed silica-coated $Zn_2SiO_4$:Mn phosphors, and the observed continuity and conformality of the silica coatings themselves indicate that the phosphor surface is stabilized by the presence of the coating, thereby preventing the surface manganese from interacting with the oxidizing atmosphere within the annealing furnace.

That the phosphor surface is stabilized by the presence of the silica coating may also be shown by examining the coated phosphor using x-ray photoelectron spectrometry. Listed in Table 5 are the normalized relative atomic concentrations of Al, En, Si, and Mn obtained with several samples from the measured XPS signal intensities corresponding to the Al(2p), Zn(3p), Si(2p), and Mn(2p) electrons, respectively. Sample 1 is a $Zn_2SiO_4$:Mn phosphor coated with alumina according to the method described in U.S. Pat. 4,999,219 using aluminum isopropoxide (AIP) as the organometallic coating precursor. Sample 3 was obtained by coating the same phosphor with silica as described in Example 1 (using TMOS as the coating precursor). Samples 2 and 4 were obtained by air-annealing samples 1 and 3, respectively, for 4 hours at 750° C.

TABLE 5

| Sample | Material | Al (2p) | Zn (3p) | Si (2p) | Mn (2p) |
| --- | --- | --- | --- | --- | --- |
| 1 | AIP/$O_2$-Coated[a] $Zn_2SiO_4$ | 100 | 0 | 0 | 0 |
| 2 | Sample 1, annealed 4 hr @ 750° C. | 100 | 13 | 0 | 3 |
| 3 | TMOS/$O_2$-Coated[b] $Zn_2SiO_4$ | 0 | 0 | 100 | 0 |
| 4 | Sample 3, annealed 4 hr @ 750° C. | 0 | 0 | 100 | 0 |
| 5 | Sample 4 AIP-$O_2$-Coated | 100 | 0 | 0 | 0 |
| 6 | Sample 5, annealed 4 hr @ 750° C. | 100 | 0 | 0 | 0 |

[a] 2% $Al_2O_3$ Coating
[b] 2% $SiO_2$ Coating

As shown in Table 5, none of the cations present in the $Zn_2SiO_4$:Mn phosphor are detected in the XPS spectra obtained with the alumina-coated phosphor. This indicates that the AIP/$O_2$ coating is continuous and thick enough to filter any Zn(3p), Si(2p), or Mn(2p) electrons that might be emitted under x-ray bombardment. In contrast, relatively large Zn(3p) and Mn(2p) signals are detected after annealing the alumina-coated phosphor for 4 hours at 750° C. (Sample 2). These results are interpreted to indicate that these cations are mobile enough to migrate through the alumina coating during the anneal. In sharp contrast are the XPS data obtained with the TMOS/$O_2$-coated samples. In this case, silicon is the only cationic species detected either before or after the 4 hour 750° C. anneal, indicating that the zinc and manganese ions present on the surface of the $Zn_2SiO_4$:Mn phosphor do not migrate through the silica coating during the anneal. The fact that the alumina-coated phosphor possesses a distinct body-color after the anneal (thought to be due to oxidized manganese), whereas the annealed silica-coated phosphor does not possess such a body-color can be understood from these data.

Finally, consider the results obtained using the $Zn_2SiO_4:Mn$ phosphor that has been silica-coated via the $TMOS/O_2$ reaction and subsequently air-annealed for 4 hours at 750° C. (Sample 4). A quantity of this silica-coated and annealed phosphor was coated with alumina via the $AlP/O_2$ reaction as described in Pat. No. 4,999,219. As shown in Table 5 (Sample 5), Al is the only cationic species detected via XPS analysis of this material, indicating that the alumina coating is continuous and uniformly thick enough to prevent the detection of any Si(2p) electrons that might be generated under x-ray bombardment. Most significant is the fact that an identical result is obtained after annealing the double-coated phosphor for 4 hours at 750° C. In contrast to the results obtained with Sample 2 (in the absence of the silica diffusion barrier), the absence of XPS signals indicating the presence of Zn, Si, or Mn near to the surface of the annealed double-coated material and the complete absence of any detectable body-color indicates that the silica coating prevents the interaction between the phosphor and the alumina coating that would otherwise occur. This conclusion is reinforced by the relative plaque brightness data listed in Table 6 for $AlP/O_2$-Coated $Zn_2SiO_4:Mn$ phosphors with and without an underlying $SiO_2$ diffusion barrier. The $Al_2O_3$ coating amount is about 2 w/o. Shown are the measured brightnesses (relative to that of the uncoated and unannealed phosphor) of $AlP/O_2$-coated $Zn_2SiO_4:Mn$ before and after a 4 hour 750° C. anneal, both with and without a $TMOS/O_2$ (silica) diffusion barrier. As indicated in Table 6, the reduction in brightness observed with the unannealed phosphor in the absence of the diffusion barrier is more than twice that obtained with the double-coated phosphor. More significantly, the reduction in brightness observed with the annealed alumina-coated phosphor in the absence of the diffusion barrier is an order of magnitude greater than that obtained when the alumina coating was applied over the diffusion barrier. Thus, the plaque brightness measured with the double-coated and annealed phosphor was only about 1% below that measured with the virgin phos-phor.

TABLE 6

| w/o $SiO_2$* Coating | $Al_2O_3$ Anneal Conditions | Plaque Brightness Relative to that of Uncoated Phosphor |
| --- | --- | --- |
| 0 | none | 94.2% |
|  | 4 hr/750° C. | 87.7% |
| 1.20 | none | 97.3% |
|  | 4 hr/750° C. | 98.8% |

*$SiO_2$-coated phosphor was annealed 4 hours at 750° C. prior to coating with alumina.

Due to the results obtained from Examples 1-3 it was thought that the results of improved plaque brightness and lumen maintenance could be extended to fluorescent lamps. However, it is known that correlation between handlamp plaque brightness and fluorescent lamp performance for a given phosphor frequently do not exist. This results from a multitude of factors including changes in the phosphor which occur during lamp baking, lamp fabrication and the contact of the phosphor with the mercury discharge. Moreover, the mercury discharge within a fluorescent lamp contains about 15% of its emission at 185 nm. This short-wavelength emission can lead to enhanced brightness and/or damage to the phosphor which can influence the observed initial brightness and maintenance.

More specifically, in the case of the alumina coated and annealed willemite phosphor, the fluorescent lamps which have the highest lumen performance possess a plaque brightness of 92% of the virgin phosphor. However, the corresponding fluorescent lamp performance may only be a few percent lower. Further, while the handlamp photoluminescent performance is improved with a silica coated and annealed phosphor, this material exhibits a significant loss in brightness and catastrophic maintenance loss within a fluorescent lamp. This behavior is probably associated with the reaction of the phosphor with the mercury discharge within the fluorescent lamp.

Figure 5:
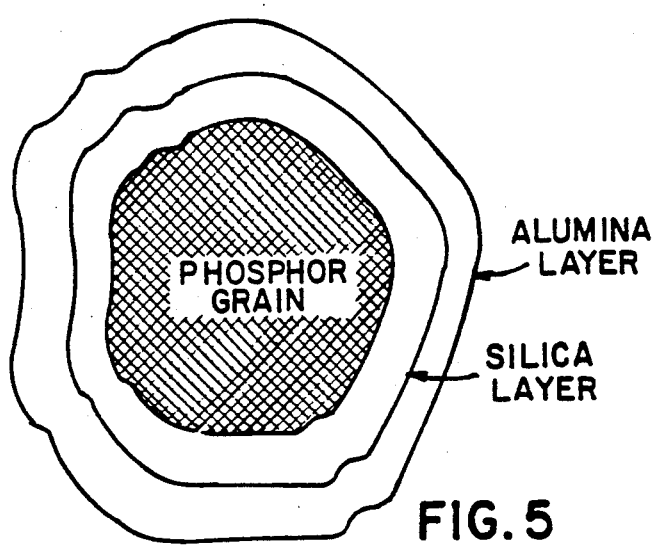
FIG. 5 shows a cross-sectional view of a phosphor particle coated with a layer of silica which is coated with a layer of alumina.

Shown in FIG. 5 is a cross-sectional view of a phosphor particle coated with a bilayer. The phosphor grain is coated with a silica layer which prevents diffusion from the phosphor grain to the surface coating of alumina. It is also believed that the silica layer prevents diffusion of the alumina layer to the phosphor grain. Potential uses of the phosphor shown in FIG. 5 are discussed below.

Historically silica and silica-containing phosphors used within fluorescent lamps are known to give rise to appreciable maintenance loss, the uncoated willemite, in fact, being a prime example of this. Therefore, any improvement due to a protective layer over a silica coating can be expected to be strongly dependent on the quality and conformality of that layer as well as the intrinsic resistance of the specific phosphor to degradation in a fluorescent lamp.

EXAMPLE 4

Phosphor Coating

Silica coatings were applied to the surfaces of zinc silicate phosphors by CVD in the fluidized bed described in Example 1. However, the tests were carried out using typically 1500 g of phosphor in an 80 mm ID quartz tube which employed a quartz frit as the distributor. Aluminum Oxide C. was blended with the phosphor at a concentration of 0.1% by weight of the fluidized bed reactor was maintained between 450° and 460° C. during the coating process. This temperature was monitored by a thermocouple placed within the bed located at the midbed height. In a typical run 2 liters per minute were run through a bubbler containing tetramethoxyorthosilicate (TMOS) liquid maintained at 32° C., and 3 liters per minute of undiluted oxygen entered the bed through a hollow stirrer rod which was located a few centimeters above the level of the porous distributor plate. Coating reactions were carried out between 1½ hours and 5 hours to effect the deposition of predetermined amounts of silica coating. Table 7 summarizes the powder properties of the virgin zinc silicate phosphors used in the following Examples.

TABLE 7

| Lot No. | Surface Area*, $m^2/g$ | FSS**, μm | Coulter Counter Particle Size (sonic) | |
| --- | --- | --- | --- | --- |
| | | | 50% | Q.D. |
| 66RMF | 0.38 | 6.7 | 9.0 | 0.23 |
| TK1-2M | 0.44 | 6.1 | 7.72 | 0.26 |

TABLE 7-continued

| Surface | Coulter Counter Particle Size (sonic) † |
|---|---| the fluidized bed through the two-micron filter element described earlier. Table 8 summarizes specific coating parameters used for the Examples cited.

TABLE 8

Coating parameters used to apply $Al_2O_3$ and $SiO_2$ layers to the zinc silicate phosphors described in this disclosure.

| No. | Sample No. | Run No. | Bed Loading | Bubbler | $O_2$ | Coating Time |
|---|---|---|---|---|---|---|
| 6RMFF | #385 | | | No silica | | |
|  | #441 | TMOS-29L | 1500 gm | 2 l/min | 3 l/min | 3½ hr |
| k1-2M | #518 | | | No silica | | |
|  | #479 | TMOS-38L | 1500 gm | 2 l/min | 3 l/min | 1½ hr |
|  | #476 | TMOS-37L | 1500 gm | 2 l/min | 3 l/min | 5 hr |
| k2-U | #425 | | | No silica | | |
|  | #443 | TMOS-30L | 1500 gm | 2 l/min | 3 l/min | 5 hr |

| No. | Sample | Run No. | Bed Loading | Bubbler | Carrier | $O_2$ | Coating Time | $SiO_2$ Wt % | $SiO_2$ Thickness# | Al O Wt % | Al O Thickness# |
|---|---|---|---|---|---|---|---|---|---|---|---|
| 6RMFF | #385 | CWM120-89 | 200 gm | 1750 cc | 1250 cc | 2500 cc | 5 hr | | | 2.28% | 150Å |
|  | #441 | CWM330-89 | 1230 gm | 1750 cc | 1250 cc | 2500 cc | 3 hr | 1.26% | 144Å | 2.22% | 147Å |
| k1-2M | #518 | CWM1017-89 | 1500 gm | 1750 cc | 1250 cc | 2500 cc | 4¼ hr | | | | 150Å |
|  | #479 | CWM614-89 | 1295 gm | 1750 cc | 1250 cc | 2500 cc | 4¾ hr | 0.81% | 80Å | 2.65% | 150Å |
|  | #476 | CWM612-89 | 1070 gm | 1750 cc | 1250 cc | 2500 cc | 3½ hr | 1.80% | 178Å | 2.62% | 150Å |
| k2-U | #425 | CWM313-89 | 350 gm+ | 400 cc | 350 cc | 500 cc | 4 hr | | | | 115Å |
|  | #443 | CWM403-89 | 1120 gm | 1705 cc | 1250 cc | 2500 cc | 35/6 hr | 1.80% | 150Å | 3.12% | 150Å |

+This run was carried out in a 40 mm I.D. quartz column; earlier data has shown equivalence between the small (40 mm) and large (80 mm) column runs. Also, no performance differences have been seen between 100–300Å $Al_2O_3$-only coated willemite
Values for the thickness are derived from the weight percent $SiO_2$ or $Al_2O_3$ deposited and an assumed density of 2.3 gms/cc and 3.97 gms/cc, respectively.

| Lot No. | Area*, $m^2$/g | FSS**, μm | 50% | Q.D. †† |
|---|---|---|---|---|
| TK2-U | 0.52 | 5.1 | 6.65 | 0.27 |

*Determined by single-point BET measurements, using a Quantachrome Monosorb surface area instrument.
**Fisher Seive Size
† Based on volume.
††Q.D., a relative measure of breadth in the particle distribution, is defined as $(d_{75\%}-d_{25\%})/(d_{75\%}+d_{25\%})$.

Following coating, the phosphors were annealed in quartz boats for about 4 hours at an annealing temperature of approximately 760° C. At this point the phosphors were coated with alumina as described below.

The CVD coatings were carried out on the annealed phosphors described above in a fluidized bed using trimethyl aluminum (TMA) and oxygen as precursors. The equipment and procedures for fluidized bed coating of willemite phosphors are described in detail in Pat. No. 4,950,948. Briefly, a blend of approximately 1000 to 1300 g and 0.1 of Aluminum Oxide C by weight of phosphor was loaded into a quartz fluidized bed column comprising an 80 mm ID quartz tube having a quartz frit fueled to the bottom which acted as the distributor plate. A 65 mm stainless steel agitator disc was attached to a vibromixer agitator. Approximately 5 cm from the base, a two-micron stainless steel filter element was welded in line and functioned as a diffuser of the oxygen mixture. The agitator disc itself was located approximately 25 mm above the quartz distributor. A thermocouple, located at the midbed height within the fluidized bed, was used to monitor the temperature of the bed, which was maintained between approximately 420° and 450° C.

The apparatus used for carrying out the coating reactions is shown in FIG. 1 with some slight alterations. In a typical run, which lasted between 3 and 5 hours, 1750 cc/min of nitrogen passed through a bubbler 12 containing trimethyl aluminum (TMA) liquid which was maintained at 30° C. Another 1250 cc/min of nitrogen carrier gas was used to dilute the flow through line 111. The combined flow was used to fluidize the phosphor particles in reaction vessel 15. The oxygen as an oxygen/inert gas mixture was introduced through line 21 at 2500 cc/min of oxygen and 50 cc/min of nitrogen into Once the phosphor particles were coated, they were transferred to quartz boats and annealed at approximately 760° C. for 4 hours.

Lamp Testing

After the annealing step described above, the phosphors were coated into 20WT12 or 30WT12 fluorescent lamps using conventional water base suspension systems. The lamps thus coated were processed into finished fluorescent lamps and photometrically evaluated. The data were then converted to corresponding 40WT12 data using established correction factors.

In the tests cited below, the bilayer coated and annealed phosphors were tested against Sylvania Type 2293, which is a Ce,Tb, Mg Aluminate phosphor used as a green-emitting component in high color rendition lamps. In addition, the uncoated virgin phosphor and the singly coated and annealed (i.e., alumina only) phosphors were also evaluated with the test.

Table 9 lists the lifetest results of the phosphors. The values given in Table 9 have been corrected from corresponding 20WT12 and 30WT12 to 40WT12 fluorescent lamp data using established correction factors. Test Samples for lots 66RMF and TK2-U were evaluated in 20WT12 lamps; Lot TK1-2M was evaluated in 30WT12 lamps. It is clearly evident that the bilayer coating provides 0-hour brightness values which are either equivalent to or exceed that of the virgin phosphor lot. Also, both the single- and bilayer-coated phosphors possess maintenance which significantly exceeds the virgin phosphor. However, the bilayer ($Al_2O_3/SiO_2$) annealed phosphor substantially exceeds the brightness of the $Al_2O_3$-only phosphor by 8% for the 'RMF' phosphor (66RMF) to as much as 17% for the singly fired willemite phosphors (TK1-2M and TK2-U lots). Note that the brightness observed for the alumina-only coated and annealed singly fired willemite phosphor lots are so low as to eliminate their consideration for commercial use in conventional high color rendition lamps, whereas the substantially higher brightness of the $Al_2O_3/SiO_2$ coated singly fired phosphor allows its use in triblend lamps. The thickness of the silica coatings are derived from the information shown in Table 8.

TABLE 9

| Phosphor | Br., lumens | | | Br., lumens | |
|---|---|---|---|---|---|
| | 0 hr | 100 hr | % M (0-100) | 500 hr | % M (0-500) |
| 66RMF Lot: | | | | | |
| Virgin | 5329 | 3800 | 71.3 | | |
| Discontinued | | | | | |
| #385 Al$_2$O$_2$ | 4860 | 4763 | 98.0 | 4685 | 96.4 |
| #441 Al$_2$O$_2$/SiO$_2$ | 5245 | 5101 | 97.3 | 5048 | 96.2 |
| FHX164 Type 2293 | 4923 | 4768 | 96.8 | 4685 | 95.2 |
| TK1-2M Lot: | | | | | |
| Virgin | 5199 | — | — | — | — |
| #578* Al$_2$O$_3$ | 4491 | 4424 | 98.5 | — | — |
| #479 Al$_2$O$_3$/SiO$_2$ (80Å) | 5219 | 5193 | 99.5 | 4887 | 93.6 |
| #476 Al$_2$O$_3$/SiO$_2$ (178Å) | 5239 | 5137 | 98.0 | 4895 | 93.4 |
| FHX343 Type 2293 | 4873 | 4757 | 97.6 | 4499 | 92.3 |
| TK3-U Lot: | | | | | |
| Virgin | 5021 | — | — | — | — |
| #425 Al$_2$O$_3$ | 4499 | 4332 | 96.3 | 4264 | 84.7 |
| #443 Al$_2$O$_3$/SiO$_2$ | 5084 | 4878 | 95.9 | 4842 | 95.2 |
| FHX164 Type 2293 | 4923 | 4768 | 96.8 | 4685 | 95.2 |

*This sample was run in a separate test against Type 2293 Lot FHX343, where GHX343 gave 0 hr = 4903 l, 100 hr = 4736 l, (0-100% M = 96.6%); therefore, the major conclusions put forth are not affected.

As mentioned earlier, the singly fired phosphor can be manufactured on a production scale with much higher yields than can be obtained using the 'RMF' synthesis described by Kasenga in U.S. patent application Ser. No. 07/434,741, now U.S. Pat. No. 4,956,202, issued on Sep. 11, 1990. The much higher yields and efficiencies of scale favor substantial cost savings.

It is important to note that the addition of the silica interface provides a major improvement in the 100-hour brightness, as well, over the alumina coatings alone. As the data in Table 9 show, Sample #479 has yielded a 100-hour brightness of 5193 lumens. This corresponds to the highest value ever achieved for a willemite phosphor after 100 hours of burning corrected to equivalent 40WT12 fluorescent lamp performance. This has significant commercial implications since published ratings of 'initial brightness' are actually those determined after 100 hours of lamp operation.

When tricomponent blend suspensions are used which consist of Y$_2$O$_3$:Eu for the red emission, barium magnesium aluminate:Eu for the blue emission, and the 'RMF' coated and annealed phosphor described by U.S. application Ser. No. 07/434,741 for the green emission, a slight color variation in the emitted light is observed from the fluorescent lamp across its length manifested by a slightly red coloration on the more thinly coated end of the lamp and slightly green coloration on the more thickly coated end is believed to be due, in part, to the disparity in particle size between the red and green phosphors in the suspension used to make the coated lamps. In fact, lamp fabrication using Sample #443, a bilayer coated and annealed TK2-U lot of smaller particle size than the 'RMF' phosphor, showed a significant reduction in color nonuniformity compared to a coated and annealed 66RMF phosphor (Sample #441) run in the same test. Thus, the bilayer coating allows particle size reduction while maintaining excellent brightness for high color rendition triblend applications.

Table 10 lists the x-ray photoelectron spectroscopy (XPS) analyses of the surfaces after each of the stages of processing leading to the alumina only and alumina/-silica coated and annealed phosphors. The data clearly show that the silica layer either eliminates or substantially reduces the migration of Zn and Mn through the alumina coating. It is also expected, although not experimentally verified, that the silica interfacial layer also prevents the migration of Al ions from the alumina coating into the zinc silicate phosphor. Both factors contribute to the elimination of undesirable light-absorbing body color of the annealed phosphor and the interference from impurities that lead to the loss in generation of efficient luminescence.

TABLE 10

| Sample Designation | Atomic Percent | | | | | |
|---|---|---|---|---|---|---|
| | Si | Al | O | Zn | Mn | C |
| 66 RMF Virgin Powder | 15.8 | — | 54.6 | 22.3 | 0.7 | 6.6 |
| CWM 120-89 (TMA coated) | — | 43.4 | 51.6 | <0.1 | — | 4.9 |
| #385 (TMA coated/annealed) | — | 42.0 | 52.5 | 4.3 | 0.2 | 1.1 |
| TMOS 291 (Silica coated) | 38.5 | — | 58.8 | 1.1 | — | 1.4 |
| #439 (Silica annealed) | 39.0 | — | 58.2 | — | — | 2.8 |
| CWM 330-89 (TMA coated #439) | — | 44.1 | 51.6 | — | — | 4.3 |
| #441 (CWM 330-89/annealed) | — | 45.2 | 51.3 | 0.2 | — | 3.2 |
| TK-2U Virgin phosphor | 16.0 | — | 48.6 | 17.7 | 0.9 | 16.0 |
| CWM 313-89 (TMA coated) | — | 43.7 | 52.8 | — | — | 3.5 |
| #425 (TMA coated/annealed) | — | 36.9 | 45.8 | 10.1 | 0.4 | 6.6 |
| TMOS 30L (Silica coated) | 36.4 | — | 56.1 | 0.2 | — | 7.3 |
| #440 (Silica coated/annealed) | 37.2 | — | 53.9 | <0.1 | — | 8.8 |
| CWM 403-89 (TMA coated #440) | — | 43.6 | 52.8 | — | — | 3.6 |
| #443 (CWM annealed) | — | 45.4 | 50.4 | <0.1 | — | 4.2 |
| TK1-2M Virgin phospor | 13.3 | — | 44.1 | 27.7 | 0.5 | 14.3 |
| TMOS 38L (Silica coated) | 38.1 | — | 60.4 | <0.1 | — | 1.5 |
| #477 (Silica coated/anneal) | 37.7 | — | 59.8 | <0.1 | — | 2.4 |
| CWM 614-89 (TMA coated #477) | — | 42.5 | 53.1 | — | — | 4.4 |
| #479 (CWM 614-89 annealed) | — | 45.1 | 51.8 | <0.1 | — | 3.0 |

Lamp tests carried out employing the single-coated alumina 'RMF' zinc silicate phosphor produced by the Chemical and Metallurgical Division of GTE Products Corporation, Towanda, Pa., have shown a lower brightness level in tri-phosphor blends when compared with the rare-earth-containing blends run in the same test. (See Table 11). A bilayer (Al$_2$O$_3$/SiO$_2$) coated willemite described employing a single-step fired willemite base material in 40WT12 fluorescent lamps (Sample #541) has yielded performance of 5280 lumens at 0 hours of lamp operation and 5144 lumens at 100 hours with a maintenance of 97.4%, which exceeds that of the Type 2293 by almost 1%. This performance substantially exceeds that obtained with the best alumina-coated "RMF" materials heretofore available Table 11a lists single-component lifetest data for lamps containing alumina-coated 'RMF' willemite and rare-earth green tri-phosphor blends. (Lifetest data for single components in 40WT12 fluorescent lamps are given in Table 11b.) Thus, this substantially less expensive silica/alumina coated single-step fired willemite phosphor is shown to be useful as single components and as components of blends in double twin-tube lamps. This phosphor may be used to replace the more expensive Sylvania Type 2293 and the Nichia LaPO$_4$:Ce,Tb phosphors presently used. Further uses for the silica/alumina coated phosphors are discussed below.

TABLE 11a

| Green Test Sample | P. Wt., g | X | Y | Br., lumens 0 hr | Br., lumens 100 hr | % M (0-100 hr) |
|---|---|---|---|---|---|---|
| Single-Coat Lamps: 20 WT 12, 3500°K. | | | | | | |
| Control 2293 | 1.95 | 0.410 | 0.398 | 1433 | 1389 | 96.9 |
| G077 (Willemite) | 1.85 | 0.408 | 0.397 | 1354 | 1308 | 96.6 |
| Delta Lumens: | | | | −79 | −81 | |
| Delta Percent: | | | | −5.5% | −5.8% | |
| Double-Coat Lamps: 20WT12, D35 (Designer, 3500° K.) | | | | | | |
| Control 2293 | 0.52* | 0.412 | 0.400 | 1353 | 1339 | 99.0 |
| G077 (Willemite) | 0.55* | 0.412 | 0.398 | 1314 | 1291 | 98.2 |
| Delta Lumens: | | | | −39 | −48 | |
| Delta Percent: | | | | −2.9% | −3.6% | |

*Second coat.

TABLE 11b

| Green Test Sample | Br., lumens 0 hr | Br., lumens 100 hr | % M (0-100 hr) |
|---|---|---|---|
| Control 2293 | 4921 | 4740 | 96.3 |
| G077 (60 RMF) | 5019 | 4695 | 93.5 |
| Virgin 60RMF (uncoated) | 5134 | 4143 | 80.7 |

Figure 6:
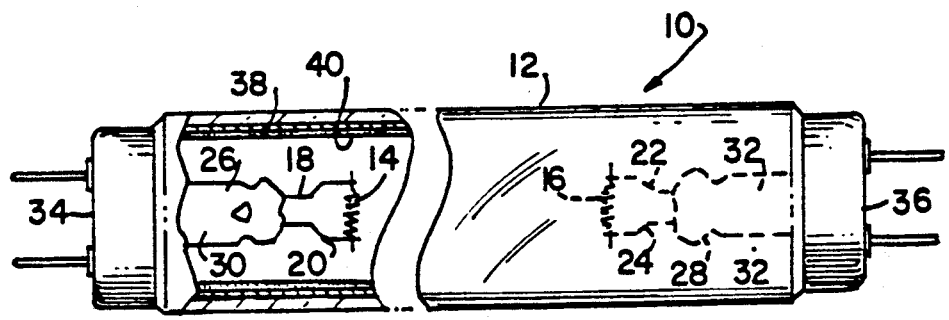
FIG. 6 shows an elevational view of double coated fluorescent lamp.
Figure 7:
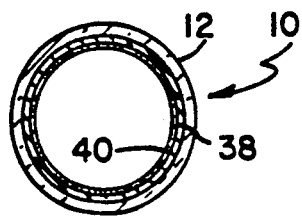
FIG. 7 shows a cross-sectional view of the lamp of FIG. 6.

Referring to FIGS. 6 and 7, there is shown in FIG. 6 an arc discharge lamp of the fluorescent type. The lamp 10 is comprised of an elongated glass tube 12 of circular cross-section. It has the usual electrodes 14 and 16 at each end supported by lead-in wires, 18, 20 and 22, 24, respectively, which extend through glass presses 26, 28 in mount stems 30, 32 to the contacts in bases 34, 36 affixed to the ends of the lamp.

The sealed tube is filled with an inert gas such as argon or a mixture of argon and krypton at a low pressure, for example 2 torr, and a small quantity of mercury, at least enough to provide a low vapor pressure during operation.

The interior of tube 12 is coated with a first layer of phosphor 38 such as, for example, a calcium halophosphate activated by antimony and manganese.

A phosphor coating suspension was prepared by dispersing the phosphor particles in a water-based system employing polyethylene oxide and hydroxyethyl cellulose as the binders with water as the solvent.

The phosphor suspension was applied in the usual manner of causing the suspension to flow down the inner surface of the bulb and allowing the water to evaporate leaving the binder and phosphor particles adhered to the bulb wall.

The first layer 38 was then dried prior to overcoating with a second phosphor layer 40 comprised of narrow-band red- and blue-emitting phosphors and a broad-band green-emitting phosphor. These two narrow-band phosphors can be, for example, an yttrium oxide activated by trivalent europium and having a peak emission at 611 nm; and barium magnesium aluminate activated by divalent europium and having a peak emission at 455 nm. The broader bend phosphor was alumina/silica-coated zinc silicate activated by manganese and having a peak emission at 528 nm.

The second phosphor layer containing the CVD-coated phosphor is applied from a water-based suspension by allowing the coating to flow down over the first phosphor layer 38 until the phosphor coating drained from the bottom of the bulb indicating the coverage of the phosphor layer 38 was complete. Lamps made by this method usually exhibit the thinnest coating thickness on the top end of the bulb and the heaviest thickness on the bottom end, where the suspension is allowed to drain. The double-coated bulbs were then baked and processed into fluorescent lamps by conventional techniques.

In the case where only a single layer lamp was made, the methods were essentially the same as described herein with the exception that the halophosphate layer was not applied.

Control lamps were fabricated by identical techniques as described above but had a narrow-band green-emitting magnesium aluminate phosphor activated by cerium and terbium in the second phosphor layer with a peak emission at 545 nm. This phosphor is generally used in the tri-phosphor blend but was replaced by the green CVD-coated willemite phosphor described herein.

Lamps employing a representative alumina-only coated and annealed 'RMF' willemite phosphor, manufactured by the Chemical and Metallurgical Division of the Precision Materials Group of GTE Corporation, Towanda, Pa., were also fabricated and incorporated into the testing.

Lifetest data and particle size information for the single component willemite phosphors used for the tri-phosphor blend lamps are given in Tables 12 and 13, respectively. These values have been corrected to obtain the performance levels that would be observed with 40T12 fluorescent lamps using established correction factors.

TABLE 12

Lifetest data for single-component fluorescent lamps containing coated willemite phosphors (corrected to 40WT12)

| | 0 Hr | 100 Hr | 500 Hr | % M (0-500 Hr) |
|---|---|---|---|---|
| Type 2293 (control) | 4923 | 4768 | 4685 | 95.2 |
| #425 (TK2-U)+ | 4499 | 4332 | 4264 | 94.7 |
| #443 (TK2-U)++ | 5084 | 4878 | 4842 | 95.2 |
| G103 (61RMF)+ | 5085 | 4804 | 4677 | 92.0 |
| #441 (66RMF)++ | 5245 | 5101 | 5048 | 96.2 |

+Phosphor grains coated with only a single coating of alumina, (sample G103 was prepared at Chemical and Metallurgical Div., PMG, GTE Corp., Towanda, PA).
++Phosphor grains coated with both silica and alumina.

TABLE 13

Particle properties of the virgin zinc silicate phosphors used in the examples cited.

| Lot Number | FSS (Fisher Sieve Size, microns) | Coulter Counter Particle Size (sonic) 50% | Coulter Counter Particle Size (sonic) Q.D. |
|---|---|---|---|
| Singly Fired | | | |
| TK-U | 5.1 | 6.7 | 0.27 |
| 'RMF' | | | |
| 60 RMF | 7.4 | 9.3 | 0.21 |
| 61 RMF | 8.0 | 10.0 | 0.21 |
| 66 RMF | 6.7 | 9.0 | 0.23 |

For the evaluation of the tri-blends containing the alumina/silica-coated willemite phosphor, two different lamp types were used, and compared with controls which did not have this phosphor in the blend. The lamps were tested by photometering for light output in a standard photometric sphere, both initially and at stated times. lumens. Lamp color values were obtained by spectral power distribution (SPD) measurements.

EXAMPLE 5

Figure 9:
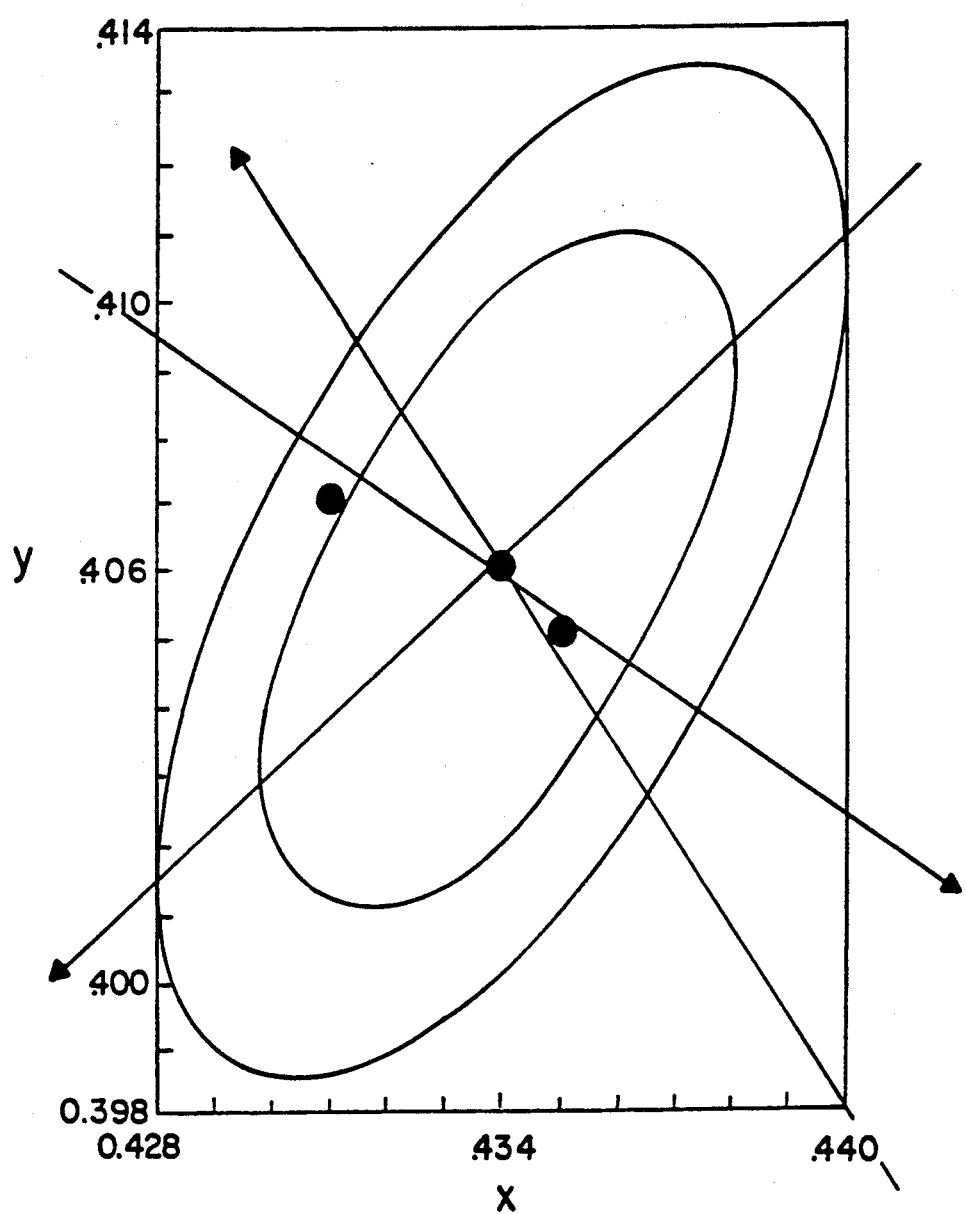
FIG. 9 shows the color points taken at 3 positions of double coated lamp using an "RMF" phosphor.
Figure 10:
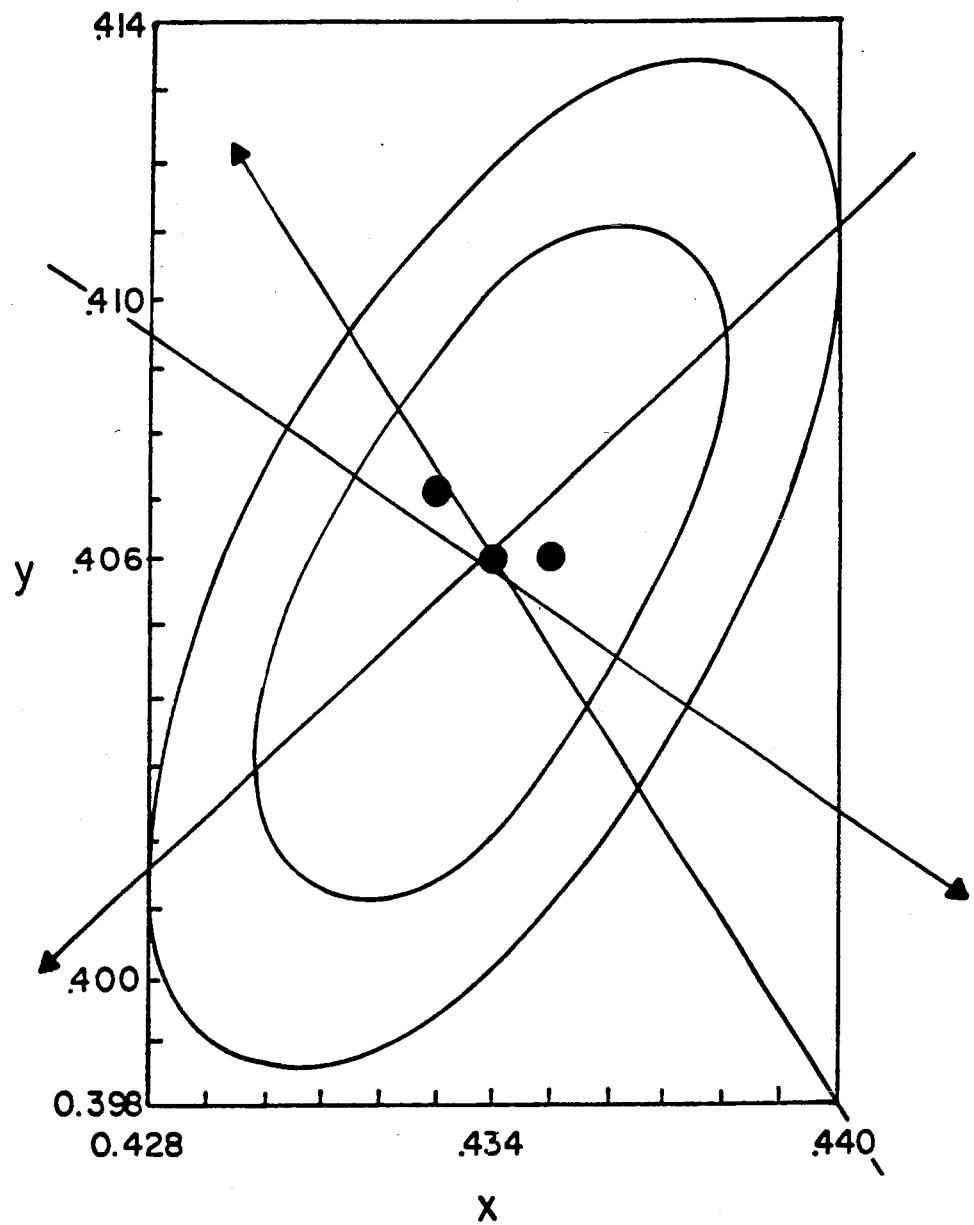
FIG. 10 shows the color points taken at positions of a double coated lamp using the phosphor of the present invention.

This example compares the light output and maintenance of alumina/silica-coated and annealed willemite phosphors in the tri-phosphor blends for double layered 96-inch Designer 3000° K. High Output Super Saver fluorescent lamps. This lamp type has a tri-phosphor weight in the second layer of about 15% of the total phosphor in the two layers. The lamps were fabricated to obtain the same x and y color coordinates for both the test and control by adjusting the tri-phosphor blend composition. The lamp test results are listed in Table 14. As the test data show, the lumens and lumen maintenance of the test group are equivalent to the rare-earth-containing Type 2293 control. This is in contrast to previous results obtained with alumina-only (single-coated and annealed) 'RMF' phosphor where Designer lamp brightness values were typically 3% to 4% lower than those obtained with the standard tri-phosphor blend (see Table 11 for comparison).

tion is excellent in the case of the rare-earth green Type 2293. However, the 'RMF' -based phosphor shows a red and green variation along the length of the lamp, as shown in FIG. 9. In contrast, as shown in FIG. 10, the singly fired phosphor (Sample #443) shows a significant improvement in color uniformity over the 'RMF' phosphor, well within acceptable limits. It is thought that the color non-uniformity originates from a particle-size disparity between the red and green phosphors that make up the dispersion from which the lamps are made. Thus, the bilayer coating allows particle size reduction of the green component while maintaining excellent brightness for high color rendition applications. (As shown in Table 12, the fluorescent lamp brightness obtained with the alumina/silica-coated small particle phosphor (Sample #443) is much superior to that obtained with the same base phosphor coated only with alumina (Sample #425)).

EXAMPLE 7

TABLE 14

Lifetest data for double-coat lamps where the triblends contain rare-earth green-emitting phosphor and two $Al_2O_3/SiO_2$-coated willemite phosphors.
Lamp Type: 96T12/D30/HO/SS (Designed, 3000° K., high output, Supersaver)

| Green Component | | Composition-Second Layer Tri-Phosphor (Weight %)+ (1) | | | Tri-Phosphor | Color Coordinates | |
|---|---|---|---|---|---|---|---|
| Test Sample | Phosphor | Red ($Y_2O_3$:Eu) | Blue (Ba, MgAlO:Eu) | Green | Weight (Grams) | X | Y |
| Control 2293 | (Ce, Tb)MgAlO:Ce, Tb | 65.8 | 2.9 | 31.3 | 1.84 | 0.429 | 0.410 |
| #441 (66RMF) | $Zn_2SiO_4$:Mn, W'RMF'* | 66.7 | 2.5 | 30.8 | 1.90 | 0.435 | 0.405 |
| #443 (TK2-U) | $Zn_2SiO_4$:Mn, W single fired | 66.1 | 2.5 | 31.4 | 1.92 | 0.434 | 0.403 |

| | Photometric Results: | | | |
|---|---|---|---|---|
| | Lumens 0 Hour | Lumens 100 Hours | Lumnes 500 Hours | Lumen Maintenance % 0–500 Hours |
| Control 2293 | 8753 | 8573 | 8060 | 92.1 |
| #441 | 8763 | 8430 | 8082 | 92.2 |
| #443 | 8765 | 8368 | 8063 | 92.0 |

+First layer is a holophosphate phosphor Sylvania Type 4300 with color coordinates in finished lamp of X = 0.440, Y = 0.405; first layer weight = 11–12 gms.
*Alumina/silica coated
(1) Red component is Sylvania Type 2345 ($Y_2O_3$:Cu); Blue component is Sylvania Type 246 (Ba, MgAlO:Eu)

EXAMPLE 6

As mentioned earlier, color nonuniformities of fluorescent lamps containing the 'RMF' coated and annealed increases. The 96-inch lamps have shown the most pronounced variation. Color nonuniformities strongly influence consumer acceptance of the lamp since they are a premium-priced product designed for use in high color rendition applications.

Figure 8:
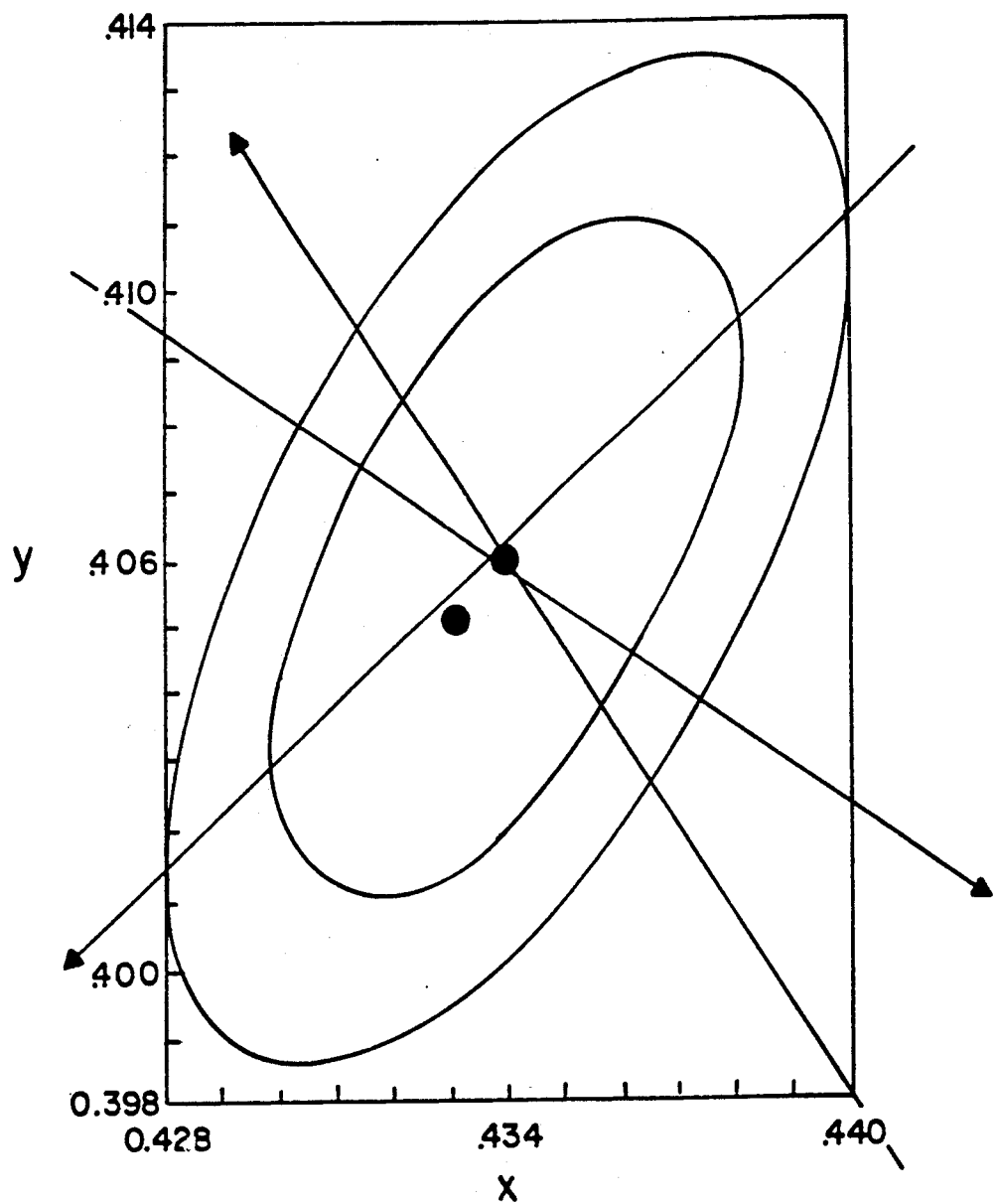
FIG. 8 shows the color points taken at 3 positions of a double coated-lamp using Type 2293 phosphor.

FIGS. 8 through 10 show the color points taken from the more heavily coated end (HE), middle (M), and more lightly coated end (LE) of the fluorescent lamp containing the rare-earth green, the bilayer-coated 'RMF' phosphor (#441), and the bilayer-coated single-fired willemite phosphor (#443), respectively. Also shown are the two-and three-step Macadam ellipses. The Macadam ellipse is a way of assessing differences in visual color perception. For acceptable lamps it is desirable to have all points residing well within the two-step ellipse. As shown in FIG. 8, the end-to-end color varia- This example compares the light output and maintenance of alumina-coated and alumina/silica-coated willemite phosphors in 40WT12 4100° K. single-coat tri-phosphor lamps. This test is designed to exaggerate differences in performances between the green components used in the triblends, since the single layer of high color temperature requires the largest amount of green compared to any other lamp that would be fabricated. That is, any differences in performance will diminish as the triblend layer thickness is reduced (in double layer lamps) and as the lamp color temperature is reduced (since the fraction of green component in the blend goes down as the color temperature is reduced).

As the data in Table 15 show, the maintenance of all materials tested are comparable. Further, the color rendering index, measured after 100 hours of lamp operation, is about 3 units higher for the willemite-containing blends compared to the rare-earth-containing blend, even in this single-coat lamp, achieving CRI values in excess of 85.

TABLE 15

Lifetest data for triblends containing rare-earth green-emitting green phosphor, alumina-coated willemites, and $Al_2O_3/SiO_2$-coated willemite phosphors.
Lamp Type: 40T12/4100° K./single-coat triphosphor (no halophosphate layer)

| Green Component | | Composition-Second Layer Tri-Phosphor (Weight %)* | | |
|---|---|---|---|---|
| Test Sample | Phosphor | Red ($Y_2O_3$:Eu) | Blue (Ba, MgAlO:Eu) | Green |

TABLE 15-continued

Lifetest data for triblends containing rare-earth green-emitting green phosphor, alumina-coated willemites, and $Al_2O_3/SiO_2$-coated willemite phosphors. Lamp Type: 40T12/4100° K./single-coat triphosphor (no halophosphate layer)

| | | | | |
|---|---|---|---|---|
| Control 2293 | (Ce, Tb)MgAlO:Ce, Tb | 48.0 | 10.3 | 41.6 |
| G103(61RMF)** | $Zn_2SiO_4$:Mn, W RMF $Al_2O_3$ only | 51.4 | 11.4 | 37.2 |
| #441 (66RMF)*** | $Zn_2SiO_4$:Mn, W RMF | 54.8 | 11.6 | 33.6 |
| #443 (TK2-U)*** | $Zn_2SiO_4$:Mn, W Single Fired | 53.1 | 12.6 | 34.3 |

| Green Component Test Sample | Phosphor | Tri-Phosphor Weight (Grams) | Color Coordinates X | Color Coordinates Y | CRI 100 Hours |
|---|---|---|---|---|---|
| Control 2293 | (Ce, Tb)MgAlO: Ce, Tb | 3.31 | 0.376 | 0.385 | 82.5 |
| G103(61RMF)** | $Zn_2SiO_4$:Mn, W RMF $Al_2O_3$ only | 3.85 | 0.376 | 0.385 | 85.6 |
| #441(66RMF)*** | $Zn_2SiO_4$:Mn, W RMF | 4.07 | 0.380 | 0.389 | 85.3 |
| #443(TK2-U)*** | $Zn_2SiO_4$:Mn, W Single Fired | 3.74 | 0.378 | 0.388 | 85.4 |

Photometric Results:

| Green Component Test Sample | Lumens 0 Hour | Lumens 100 Hours | Lumens 500 Hours | Lumens 1000 Hours | Lumen Maintenance % 0–1000 Hours |
|---|---|---|---|---|---|
| Control 2293 | 3427 | 3319 | 3252 | 3161 | 92.2 |
| G103 (61RMF) | 3341 | 3183 | 3080 | 3006 | 90.0 |
| #441 (66RMF) | 3421 | 3291 | 3215 | 3176 | 92.8 |
| #443 (TK2-U) | 3364 | 3233 | 3147 | 3095 | 92.0 |

*Red component is Sylvania Type 2345 ($Y_2O_3$:Eu); Blue component is Sylvania Type 246 (Ba, MgAlO:Eu)
**Manufactured at Chemical & Metallurgical Division, PMG, Towanda, PA (Alumina-coated willemite phosphor)
***Alumina/Silica-coated willemite phosphor.

With regard to brightness, the bilayer-coated 'RMF' phosphor (#441) is clearly superior to the representative singly coated 'RMF' phosphor (G103). The brightness performance of the bilayer-coated singly fired zinc silicate (#443), while exceeding that of the alumina-coated 'RMF' phosphor (G103), is about 2% below that of the rare-earth Type 2293 control, at 1000 hours of lamp operation. However, by way of comparison a singly fired (smaller particle) willemite phosphor with only the alumina coating (i.e., without the intervening layer of silica) is completely unsuitable for use in triblend applications because its brightness is about 10% below that of the corresponding alumina/silica-coated phosphor (i.e., less than 4500 lumens initial brightness in a 40WT12 fluorescent lamp), as shown in Table 12.

The use of the bilayer-coated phosphor provides a substantial cost savings over the rare-earth blends in the examples cited above since the tri-phosphor blend represents the major cost of the lamp and, as Table 14 shows, the green component comprises over 30% of the tri-phosphor blend.

Further, the use of the singly fired bilayer-coated phosphor provides even further cost savings, since the large-particle 'RMF' material with narrow particle size distribution (described in U.S. patent application Ser. No. 07/434,741) requires two firings in its synthesis with multiple decantations to remove the "fines" fraction. This necessarily results in low yields (typically 60%). However, the smaller particle material can be made, as described by Chenot, using a single-step firing followed by a washing which provides much higher yields (typically 90%). Also, the smaller particle material can easily be manufactured on production-scale equipment. The much higher yields and the efficiencies of scale all favor substantial cost savings which far outweigh the cost of applying the intermediate silica layer.

It is evident that fluorescent lamps will benefit greatly from the use of the bilayer-coated and annealed singly fired willemite phosphor by permitting a lower lamp price that finds more acceptance in the marketplace.

While what has been described herein has been fluorescent lamps employing CVD-coated phosphors in single and double-layered configurations, the scope of this disclosure can include lamps which employ multiple layers of phosphor coatings in the fabrication of the lamp, multiple components of the blend in addition to, or otherwise different from, the tri-phosphor blend formulation described herein so long as they contain the bilayer-coated willemite as one of the components, and the use of non-CVD-coated alumina/silica-coated and annealed willemite phosphor.

EXAMPLE 8

The performance of Cool-White coated fluorescent lamps, i.e. lamps coated with a single phosphor layer of an alkaline earth halophosphate, may also be improved by using as the phosphor layer an alkaline earth halophosphate coated with the bilayer described herein. For example, in FIGS. 6 and 7, the interior of sealed tube 12 of lamp 10 may be coated with a single phosphor layer 38 of a bilayer-coated and annealed alkaline earth halophosphate phosphor, in this example a cadmium-free calcium halophosphate activated by antimony and manganese.

To prepare such a single phosphor coated lamp, a phosphor coating suspension was prepared by dispersing the calcium halophosphate phosphor particles in a water-based system employing polyethylene oxide and hydroxyethyl cellulose as the binders with water as the solvent. The phosphor suspension was applied to 72 inch T-12 VHO lamp tubes in the usual manner by causing the suspension to flow down the inner surface of the tube and allowing the water to evaporate leaving the binder and phosphor particles adhered to the tube wall. The phosphor layer was then dried and the lamp assembly completed in the conventional manner.

In this example, the methods used for preparing the coated phosphor powder were essentially the same as those described above, and the preparation of the lamp was the same as that described above for the Designer Series lamps having a double phosphor layer, with the exceptions that the calcium halophosphate phosphor was a bilayer coated phosphor as described herein, having a continuous conformal coating of silica covered by a continuous conformal coating of alumina, and that no second, phosphor blend layer was applied over the calcium halophosphate layer.

Control lamps were fabricated by identical techniques as described above but had a single phosphor coating of either the same calcium halophosphate phosphor in its virgin (uncoated) state, or the same calcium halophosphate phosphor which had been alumina-only coated and annealed. The three types of Cool-White lamps were photometrically evaluated, resulting in the lifetest data given in Table 16.

TABLE 16

| Phosphor | Lumens | % Lumens* | % M** | Δ % M* |
|---|---|---|---|---|
| 0 hr: | | | | |
| Virgin (uncoated) | 11,574 | 0 | | |
| $Al_2O_3$ only | 11,324 | −2.2 | | |
| Bilayer $Al_2O_3/SiO_2$ | 11,616 | +0.4 | | |
| 100 hr: | | | 0–100 hr: | |
| Virgin (uncoated) | 10,803 | 0 | 93.3 | 0 |
| $Al_2O_3$ only | 10,899 | +0.9 | 96.2 | +2.9 |
| Bilayer $Al_2O_3/SiO_2$ | 11,206 | +3.7 | 96.5 | +3.2 |
| 500 hr: | | | 0–500 hr: | |
| Virgin (uncoated) | 10,093 | 0 | 87.2 | 0 |
| $Al_2O_3$ only | 10,449 | +3.5 | 92.2 | +5.0 |
| Bilayer $Al_2O_3/SiO_2$ | 10,900 | +8.0 | 93.8 | +6.6 |
| 1000 hr: | | | 0–1000 hr: | |
| Virgin (uncoated) | 9,319 | 0 | 80.5 | 0 |
| $Al_2O_3$ only | 10,068 | +8.0 | 88.9 | +8.4 |
| Bilayer $Al_2O_3/SiO_2$ | 10,810 | +16.0 | 93.1 | +12.6 |

*relative to virgin phosphor
**% M = % lumen maintenance

It is clearly evident from the data in Table 16 that the lumen maintenance of the bilayer coated cadmium-free Cool-White calcium halophosphate phosphor in fluorescent lamps is significantly improved over both the uncoated and the alumina-only coated phosphors. The brightness (% lumens) of the bilayer coated phosphor after 500 hr. of lamp operation was 3.5% higher than that of the alumina-only coated phosphor, and 8% higher than that of the virgin phosphor. After 1000 hr., the brightness of the bilayer coated phosphor was 8% and 16% higher than the alumina-only coated and virgin phosphors, respectively, with a gain in maintenance over the virgin phosphor of 12.6%

Such improvement in the lumen maintenance means that cadmium-free Coal-White phosphors can be produced which are suitable for use in single- and double-layer (high color rendering) fluorescent lamps.

The scope of this disclosure includes lamps which employ single, double, or multiple layers of phosphor coatings in the fabrication of the lamp, as long as at least one of the layers includes a bilayer coated phosphor as described herein. The bilayer coated alkaline earth halophosphate phosphors described herein are particularly suited to high load HO and VHO lamps in various lamp tube configurations. Some examples of such lamps are the single- or double-coated conventional (straight tube) lamps such as the double-coated T-8 lamp sold as the Sylvania "Octron" lamp and the double-coated 40WT12 Sylvania "Designer" lamp (both GTE Products Corporation). Other examples include single- or double-coated T-4 lamps in a twin-tube or double twin-tube configuration used in compact fluorescent lamps configured to replace ordinary, e.g. 100W, incandescent lamps.

While there have been shown and described what are at present considered to be the preferred embodiments of the invention, it will be obvious to those skilled in the art that various changes and modifications can be made without departing from the scope of the invention as defined by the appended claims.

What is claimed is:

1. A fluorescent lamp comprising a hermetically sealed tubular glass envelope coated with an alkaline earth halophosphate phosphor, bases at each end of said tubular glass envelope, electrodes, support electrical leads connected to said electrodes, said electrodes coated with an electron-emission promoting material, and a mercury droplet within said tubular glass envelope; said phosphor having a bilayer coating comprising a coating of alumina surrounding a coating of silica which surrounds the phosphor.

2. A lamp in accordance with claim 1 wherein the phosphor is a calcium halophosphate phosphor.

3. A high color rendition fluorescent lamp comprising a light transmissive envelope having two ends;
electrodes sealed into each end of the envelope;
an arc generating and sustaining medium which includes mercury;
a first layer of alkaline earth halophosphate phosphor coating an inner surface of the light transmissive envelope; and
a second layer of phosphor overlying the first layer of phosphor wherein the second layer of phosphor comprises a mixture of red, blue and green emitting phosphors, at least one phosphor of the mixture being a zinc silicate phosphor;
wherein each of the alkaline earth halophosphate and zinc silicate phosphors have a bilayer coating comprising a coating of alumina surrounding a coating of silica which surrounds the phosphor.

4. The high color rendition fluorescent lamp in accordance with claim 3 wherein the alkaline earth halophosphate phosphor is a calcium halophosphate phosphor.

* * * * *